United States Patent [19]

King

[11] 4,233,134
[45] Nov. 11, 1980

[54] METHOD AND APPARATUS FOR EXTRACTING POLAR SUBSTANCES FROM SOLUTION

[76] Inventor: Arthur S. King, 8021 Cherokee La., Leawood, Kans. 66206

[21] Appl. No.: 843,670

[22] Filed: Oct. 19, 1977

[51] Int. Cl.³ .............................................. B03C 5/00
[52] U.S. Cl. .................................................. 204/186
[58] Field of Search ............................. 204/186–191; 203/49; 202/236, 205

[56] References Cited

U.S. PATENT DOCUMENTS

| 2,116,509 | 5/1938 | Cottrell | 204/188 |
| 3,111,461 | 11/1963 | Hickman | 202/236 |
| 3,162,592 | 12/1964 | Pohl | 204/186 |
| 3,197,394 | 7/1965 | McEuen | 204/302 |
| 3,857,770 | 12/1974 | Keller | 204/188 |

Primary Examiner—T. M. Tufariello
Attorney, Agent, or Firm—Schmidt, Johnson, Hovey & Williams

[57] ABSTRACT

The extraction of polar substances, such as pure water, from a solution containing such substances is carried out in an electrical process that closely resembles natural evaporation. By exposing the solution to a closely spaced, electrically charged surface, the liquid molecules of the substance become sufficiently excited and attracted to break through the surface tension and migrate to the charged surface where they accumulate. Alternative embodiments disclose modified means for conveying the extracted substance from the treating area.

4 Claims, 4 Drawing Figures

METHOD AND APPARATUS FOR EXTRACTING POLAR SUBSTANCES FROM SOLUTION

This invention relates to the treatment of fluid by electrical energy and, more particularly, to a method and apparatus for extracting polar substances, such as pure water, from solutions containing such substances.

It has been discovered that because of the polar characteristics of many substances, such as pure water, such substances may be manipulated for various purposes by subjecting the material to an electric field, even though the particles themselves may possess no net positive or negative charge. They are characterized as "polar" because there are areas of positive and negative charges within each particle that produce significant dipole moments. In my U.S. Pat. No. 3,585,122, issued June 15, 1971, and entitled "Apparatus For Treatment Of Fluids With Electric Fields," it was disclosed that impurity particles in a fluid such as water, for example, could be rendered essentially neutral and nucleated by subjecting the water to an electric field, thus preventing platingout of the neutralized impurity clusters on the walls of boilers and similar equipment downstream from the treater. It is believed that one reason for the success of my treater in the aforementioned Patent is the fact that water molecules, being dipole in nature, are readily oriented or aligned when brought into close proximity to a charged electrode, the water molecules in this manner losing a large measure of their affinity for the impurity particles about which they normally cluster. While the emphasis in the aforementioned Patent was primarily placed upon manipulation of the impurity particles to render them innocuous, the present invention is directed to manipulating the water molecules themselves in such a manner that they may be extracted from the impurity particles, although it will be clear from the description which follows that the principles of the present invention are not limited to extraction of water alone, but may be utilized for separation of any other substances having suitable polar characteristics.

It has been found that if the solution is exposed to an electrically charged surface that is spaced a short distance away from the solution, a synthetic process resembling natural evaporation can be achieved. The polar liquid molecules of the substance become so excited and attracted to the surface that they overcome their surface tension and escape to the charged surface.

Maintaining a small space between the charged surface and the solution is critical because only in that way can undesired "impurity" particles, which may also be polar, be left behind while the liquid molecules escape. Generally speaking, the mass of the individual impurity particles will simply be too great to permit them to migrate to the charged surface through the space. But the more volatile liquid molecules can simply vaporize "above" the solution and accumulate on the charged surface. Obviously, many prior systems have been developed in which a charged collecting surface is immersed directly into the solution, but these systems attract and collect any and all polar particles and those charged oppositely from the attractive surface instead of being selective as contemplated by the present invention. Examples of prior systems are illustrated in U.S. Pat. No. 2,116,509 to Cottrell; 3,197,394 to McEuen; and 3,162,592 to Pohl.

Accordingly, an important object of the present invention is to provide a novel method and apparatus which relies upon the polar characteristics of suitable substances, such as pure water, to separate or extract such substances from the solution of which they are components.

A further important object of the instant invention is to accomplish extraction of a selected liquid polar substance from solution by passing the solution in close proximity, yet in spaced relationship to a charged surface, thereby causing migration of the substance from the solution to the charge-carrying surface.

Another important object of the instant invention is to provide a variety of means for collecting and transporting the extracted substance from the treating area to a remote delivery point.

Figure 1:
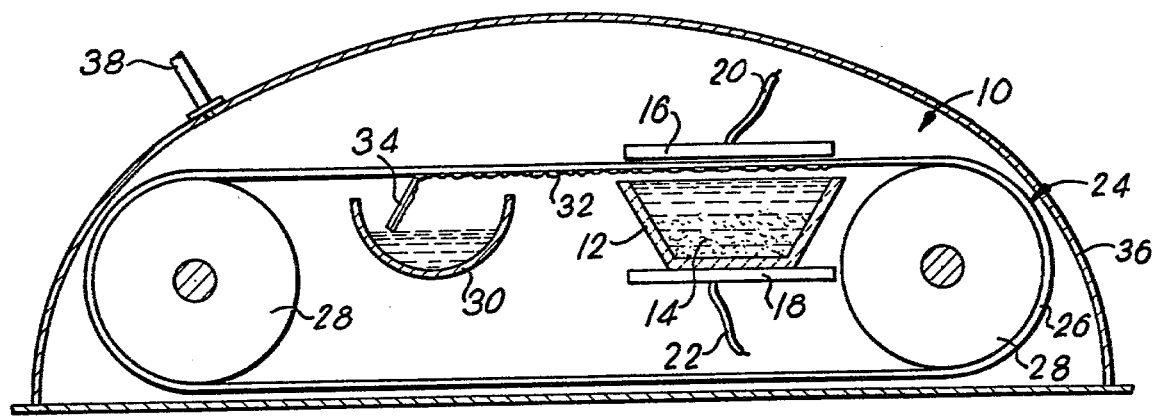
FIG. 1 is a schematic view of extraction apparatus embodying the principles of the present invention.

The treating apparatus 10 in FIG. 1 includes an open top, solution supply basin 12 of ceramic material or any other material which is incapable of passing an electrical current and holding an electric charge. A solution 14 to be treated, such as water containing dissolved solids or seawater, is slowly flowed through basin 12 below one electrode 16 which cooperates with another electrode 18 positioned below basin 12 to generate an electric field. Conductors 20 and 22 from the electrodes 16 and 18, respectively, connect the latter across a source of electrical potential (not shown) to generate the aforementioned field.

The upper electrode 16 is placed as close as possible to the surface of solution 14 without contacting the latter so that the effect of the charge on electrode 16 is maximized. In a basic form of the invention, the extracted substance may be allowed to collect on electrode 16 itself for subsequent removal therefrom and delivery to a remote collection and storage point. However, as illustrated in FIG. 1, a conveyor assembly 24 is provided to perform the collecting and transporting steps. Assembly 24 includes an endless belt 26 trained about a pair of insulated rollers 28 and passed between the surface of solution 14 and electrode 16. A collecting trough 30 receives the extracted substance 32 on the bottom of belt 26 which is removed from the latter by a doctor blade 34. A dome 36 encloses the extractor apparatus 10 and has a fitting 38 which adapts the dome 36 for connection to a source of vacuum pressure to decrease the pressure above the surface of solution 14 to accelerate the extraction process.

The material selected for belt 26 must be capable of holding an electrical charge which is imparted thereto by electrode 16. Preferably, the material chosen for use is Teflon, although other suitable materials are available.

Using an aqueous solution containing dissolved solids as an example, such as saltwater, pure water may be extracted from the solution 14 by introducing the same into basin 12 for passage in closely spaced relationship to the moving conveyor belt 26. Preferably, electrode 16 is positively charged, imparting a positive charge to the belt 26. This causes the water molecules within solution 14, because of their polar nature, to become reoriented and aligned so as to lose their affinity for the particles of dissolved solids. Furthermore, the level of excitation and attraction of the water molecules in the boundary layer of the solution becomes so high as the result of the high voltage that they overcome their surface tension and vaporize, thereupon to migrate and adhere to the surface of belt 26. The more massive, less volatile impurity particles are left behind. Once collected upon belt 26, the pure water molecules are carried by the belt 26 from the treating area to trough 30 where doctor blade 34 skims the water droplets 32 from belt 26 for collection within trough 30. The pure water thus collected in trough 30 may be used for a number of purposes requiring uncontaminated water, while the clustered impurity particles left behind in the basin 12 may be drained from the latter and either disposed of or recycled if they are useful waste products.

It has been determined that decreasing the pressure on the surface of solution 14 increases the speed of the extraction process. Therefore, by coupling the fitting 38 with a source of vacuum pressure, the forces tending to restrict the migration of water molecules from solution 14 to belt 26 are minimized. Moreover, it has been found that the application of heat to solution 14 also encourages migration of the water molecules to belt 26 so that by combining the individual actions of electrode 16, dome 36, and the heat applied, a satisfactorily rapid extraction of the pure water may be carried out.

Figure 3:
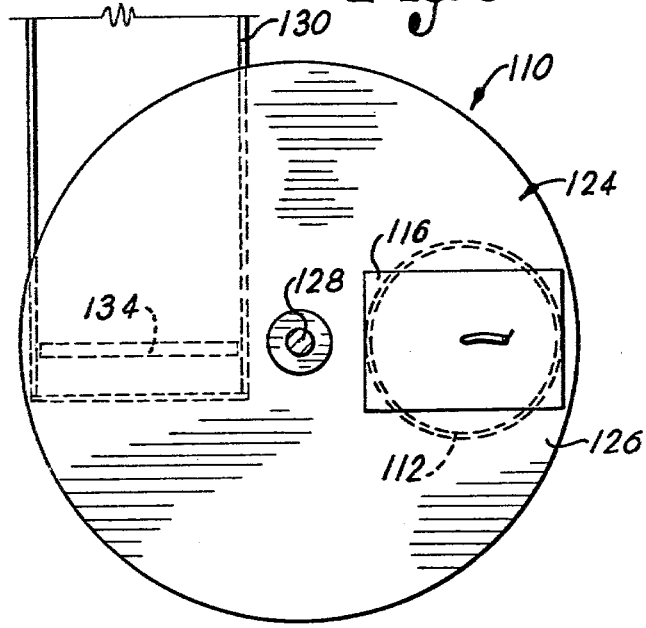
FIG. 3 is a fragmentary, essentially schematic, top plan view of the second form of extractor apparatus illustrated in FIG. 2.
Figure 2:
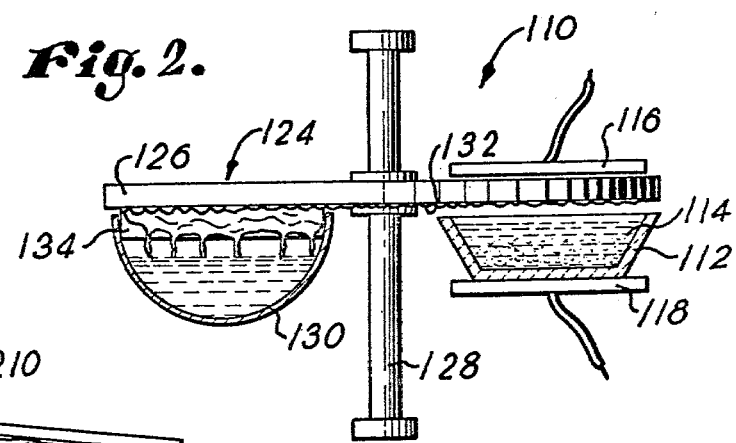
FIG. 2 is an essentially schematic view of extractor apparatus similar to that shown in FIG. 1, but employing a rotary conveyor disc in lieu of the endless belt of FIG. 1 for transporting the collected substance away from the treating area.

FIGS. 2 and 3 show a second embodiment of extractor apparatus, denoted by the numeral 110, whose basic operation is virtually identical to that of apparatus 10 except for the manner in which the extracted substance is carried from the treating area to the collection point. To this end, the conveyor means 124 includes a rotary disc 126 which is mounted upon an upright shaft 128 for continuous rotation between electrodes 116, 118 and the solution 114 contained within basin 112. The pure water or other substance 132 migrating to the surface of disc 126 adheres thereto and rotates therewith until the doctor blade 134 skims the water from disc 126 into trough 130.

Figure 4:
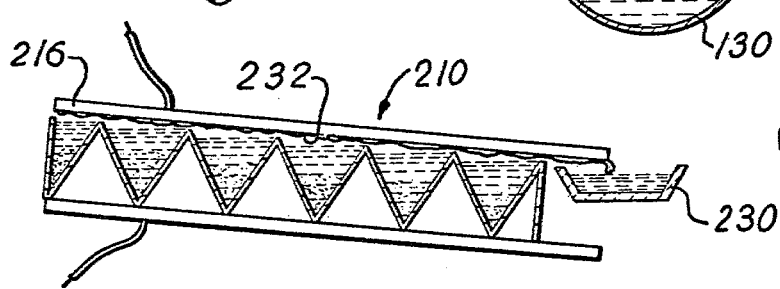
FIG. 4 is a third embodiment of the extractor apparatus of the present invention which effects delivery of the collected substance away from the treating area by gravity.

FIG. 4 shows a third embodiment of the apparatus, denoted by the numeral 210, wherein the extracted substance 232 is collected directly upon the electrode 216 and flows by gravity, by virtue of the inclination of electrode 216, to the awaiting trough 230. In all operational respects, apparatus 210 is identical to that disclosed in the first two embodiments.

Having thus described the invention, what is claimed as new and desired to be secured by Letters Patent is:

1. A method of extracting water from an aqueous solution which includes the steps of presenting the solution in spaced relationship, yet open communication and close proximity to means carrying a high voltage positive electrical charge whereby the water migrates to said charged means for collection thereon, and separating the water from said charged means.

2. An extraction method as claimed in claim 1, wherein is included the additional step of reducing the pressure at the surface of said solution to increase the rate of extraction of said water.

3. An extraction method as claimed in claim 1, wherein the step of separating the water from said charged means includes continuously moving the water collecting on said means to a remote point of delivery.

4. An extraction method as claimed in claim 1, wherein is included the additional step of supplying heat to said solution to increase the rate of extraction of said water.

* * * * *